United States Patent
Comaniciu et al.

(10) Patent No.: US 6,999,004 B2
(45) Date of Patent: Feb. 14, 2006

(54) SYSTEM AND METHOD FOR VEHICLE DETECTION AND TRACKING

(75) Inventors: Dorin Comaniciu, Princeton Jct., NJ (US); Visvanathan Ramesh, Plainsboro, NJ (US); Nikolaos Paragios, Plainsboro, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 10/463,912

(22) Filed: Jun. 17, 2003

(65) Prior Publication Data

US 2004/0131233 A1 Jul. 8, 2004

Related U.S. Application Data

(60) Provisional application No. 60/389,182, filed on Jun. 17, 2002.

(51) Int. Cl.
*G08G 1/017* (2006.01)
*G08G 1/054* (2006.01)

(52) U.S. Cl. .................. 340/937; 701/119; 346/18; 348/149

(58) Field of Classification Search ............... 340/937, 340/437; 346/18, 107.2; 348/149; 382/104; 701/119, 142, 149
See application file for complete search history.

(56) References Cited

U.S. PATENT DOCUMENTS

| 4,173,010 A | * | 10/1979 | Hoffmann | 340/937 |
| 4,847,772 A | * | 7/1989 | Michalopoulos et al. | 701/117 |
| 5,313,295 A | * | 5/1994 | Taniguchi et al. | 348/149 |
| 5,406,501 A | * | 4/1995 | Florent | 348/169 |
| 5,847,755 A | * | 12/1998 | Wixson et al. | 348/149 |

* cited by examiner

*Primary Examiner*—Thomas J. Mullen, Jr.
*Assistant Examiner*—Samuel J. Walk
(74) *Attorney, Agent, or Firm*—Donald B. Paschburg; F. Chau & Associates, LLC

(57) ABSTRACT

A system and method for vehicle detection and tracking in tunnels is provided. The method comprises the steps of capturing a plurality of image frames viewing at least one traffic lane; extracting at least one feature from the plurality of image frames; detecting at least one object indicative of a vehicle from the extracted feature; and tracking the detected vehicle over time to determine the detected vehicle's velocity. The system comprising at least one image capture device for capturing a plurality of image frames viewing at least one traffic lane; and a processor adapted for extracting at least one feature from the plurality of image frames, detecting at least one object indicative of a vehicle from the extracted feature, and tracking the detected vehicle over time to determine the detected vehicle's velocity.

15 Claims, 6 Drawing Sheets

SYSTEM AND METHOD FOR VEHICLE DETECTION AND TRACKING

PRIORITY

This application claims priority to an application entitled "SYSTEM AND METHOD FOR VEHICLE DETECTION AND TRACKING" filed in the United States Patent and Trademark Office on Jun. 17, 2002 and assigned Ser. No. 60/389,182, the contents of which are hereby incorporated by reference.

BACKGROUND OF THE INVENTION

1. Field of the Invention

The present invention relates generally to computer vision systems, and more particularly, to a system and method for vehicle detection and tracking in tunnels.

2. Description of the Related Art

Various approaches to traffic monitoring and control are being implemented on a world-wide basis. Most of these systems employ sensors that are inherently limited in the coverage area and, therefore, such systems in most instances are deployed in limited critical areas or roadways. Vehicles are then alerted or redirected as needed via large luminous signs posted on such roadways. Examples of such systems include electronic monitoring sensors embedded in the roadway or radar detectors to detect, count and monitor the velocity of vehicles on the particular roadways. However, these systems require a large number of sensors with the associated large investment required and, in addition, such solutions require constant and costly maintenance.

Of particular importance in the area of traffic monitoring is the monitoring of tunnels for incident detection. Detection of incidents, e.g., slow moving vehicles, congestion, wrong way driver and stopped vehicles, is critical in tunnels where there is usually a limited line of vision due to darkness or a winding roadway.

Conventional tunnel monitoring systems include a plurality of cameras located throughout the length of the tunnel with each camera being connected to a corresponding video monitor at a central monitoring location. A human operator then observes all the video monitors for incident detection. However, the conventional tunnel monitoring system has many drawbacks. For example, it is inefficient economically since a monitor is required for each camera. Observing many monitors at once is a difficult observation task for a human. Additionally, due to its monotonous nature, the operator may get bored and/or tired and might miss important events.

Therefore, it would be highly desirable to develop systems and methods for monitoring tunnels for incident detection with little or no human operator intervention.

SUMMARY OF THE INVENTION

The present invention is directed to systems and methods for vehicle detection and tracking in tunnels. More specifically, systems and methods according to embodiments of the present invention capture a plurality of video streams on a conventional computer platform and process the video streams for vehicle detection and tracking via feature extraction and feature processing of the video stream. Advantageously, systems and methods according to the present invention provide continuous assessment of tunnel traffic, signal potentially dangerous events, and reduce the number of monitoring personnel.

According to one aspect of the present invention, a method for vehicle detection and tracking is provided comprising the steps of capturing a plurality of image frames viewing at least one traffic lane; extracting at least one feature from the plurality of image frames; detecting at least one object indicative of a vehicle from the extracted feature; and tracking the detected vehicle over time to determine the detected vehicle's velocity. Furthermore, a detection line is defined for the at least one traffic lane and the extracting step further includes calculating a positive spatial gradient for each of the plurality of frames; calculating temporal differences between the spatial gradients of neighboring frames; and performing convolutions along the detection line of the at least one traffic lane for extracting the at least one feature.

According to another aspect of the present invention, the performing convolutions step comprises performing a first convolution for testing motion discontinuity of the extracted feature with a first, two-dimensional kernel; and performing a second convolution for testing symmetry of the observed motion with a second, two-dimensional kernel.

The extracting step further comprises subtracting the absolute value of the result of the second convolution from a result of the first convolution resulting in an objective function.

According to a further aspect of the present invention, the detecting step comprises determining a maximum value along the detection line of the objective function, wherein the maximum is indicative of the detected vehicle.

In yet another aspect of the present invention, the tracking step comprises the steps of determining a direction of the detected vehicle; and comparing the determined direction to a predetermined direction, whereby confirming the detected vehicle is going in the right direction.

According to another aspect of the present invention, a system for vehicle detection and tracking is provided comprising at least one image capture device for capturing a plurality of image frames viewing at least one traffic lane; and a processor adapted for extracting at least one feature from the plurality of image frames, detecting at least one object indicative of a vehicle from the extracted feature, and tracking the detected vehicle over time to determine the detected vehicle's velocity.

In a further aspect of the present invention, the processor is adapted for determining a direction of the detected vehicle and comparing the determined direction to a predetermined direction, and the system further comprises an annunciating device for issuing an alert when the detected vehicle is going in a direction opposite the predetermined direction. Additionally, the processor is adapted for determining if the detected vehicle is stopped, whereby the annunciating device issues an alert when the detected vehicle is determined to be stopped.

According to another aspect of the present invention, a program storage device readable by a machine, tangibly embodying a program of instructions executable by the machine to perform the method steps for vehicle detection and tracking is provided, the method steps comprising capturing a plurality of image frames viewing at least one traffic lane; extracting at least one feature from the plurality of image frames; detecting at least one object indicative of a vehicle from the extracted feature; and tracking the detected vehicle over time to determine the detected vehicle's velocity.

BRIEF DESCRIPTION OF THE DRAWINGS

The above and other aspects, features, and advantages of the present invention will become more apparent in light of the following detailed description when taken in conjunction with the accompanying drawings in which.

DETAILED DESCRIPTION OF PREFERRED EMBODIMENTS

Preferred embodiments of the present invention will be described hereinbelow with reference to the accompanying drawings. In the following description, well-known functions or constructions are not described in detail to avoid obscuring the invention in unnecessary detail.

Figure 1:
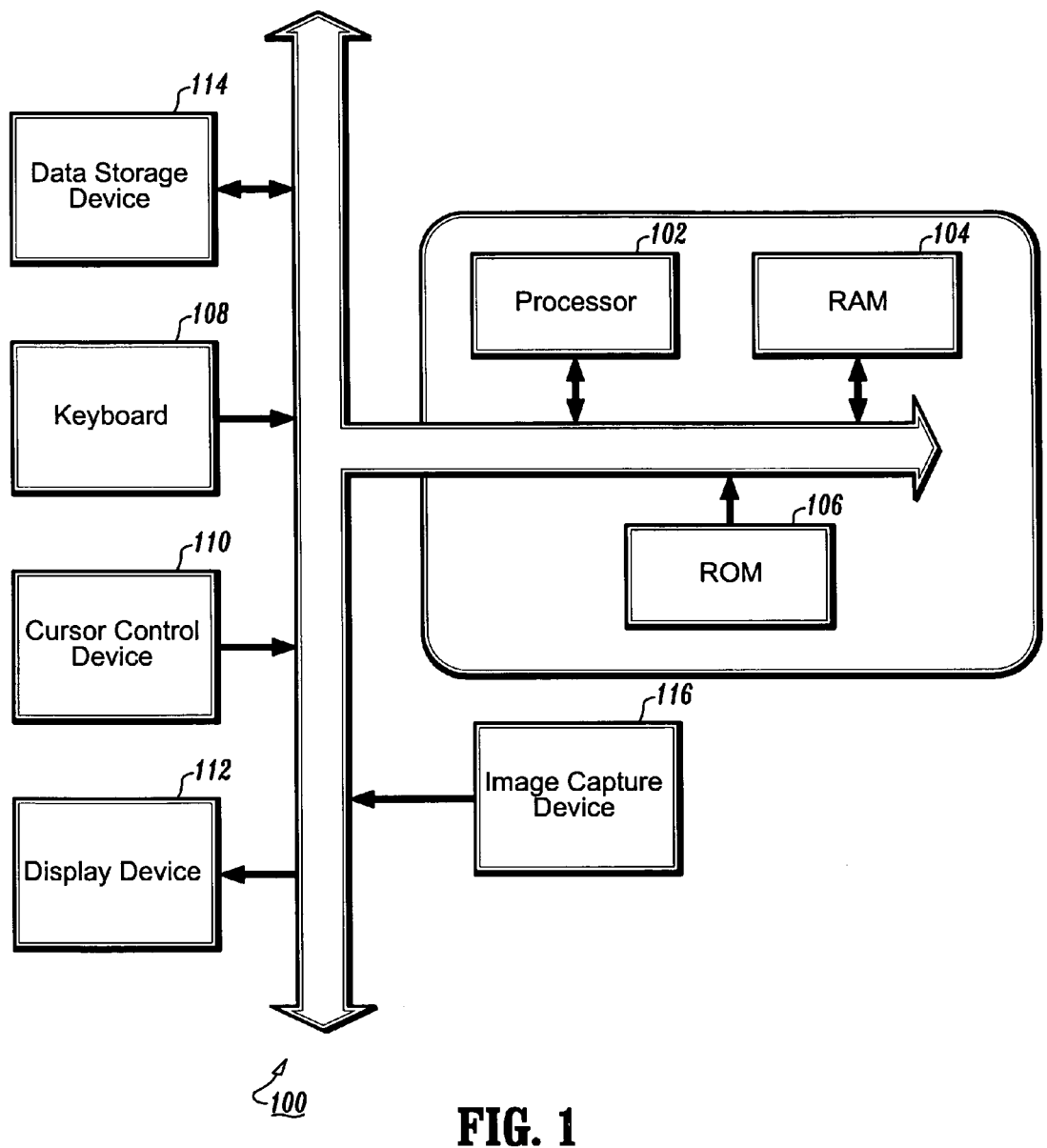
FIG. 1 is a block diagram of an exemplary system for vehicle detection and tracking in accordance with an embodiment of the present invention.

A system and method for vehicle detection and tracking in tunnels is provided. It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture such as that shown in FIG. 1. Preferably, the machine 100 is implemented on a computer platform having hardware such as one or more central processing units (CPU) 102, a random access memory (RAM) 104, a read only memory (ROM) 106 and input/output (I/O) interface(s) such as keyboard 108, cursor control device (e.g., a mouse or joystick) 110 and display device 112. The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device 114 and a printing device.

Furthermore, an image capture device 116, for example, a video camera, is coupled to the machine 100 for capturing a plurality of image frames via a DSP (digital signal processing) board. Preferably, a plurality of image capture devices 116 will be coupled to the machine 100, wherein the plurality of image capture devices are located throughout a tunnel.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 2:
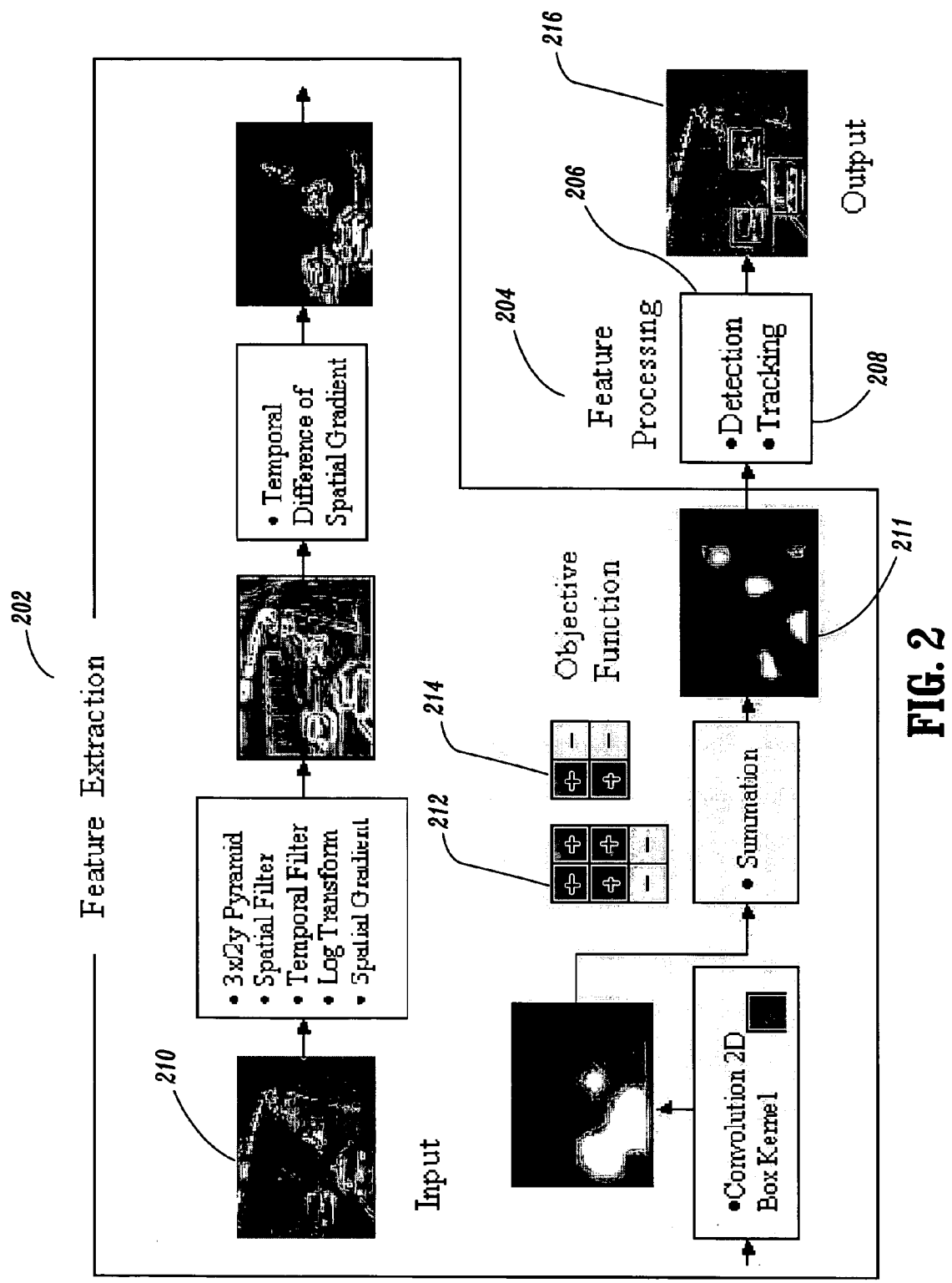
FIG. 2 is a flow diagram illustrating a method for vehicle detection and tracking in accordance with an embodiment of the present invention.

FIG. 2 is a flow diagram illustrating an overall method for vehicle detection and tracking in accordance with an embodiment of the present invention. The method generally includes two basic process: feature extraction 202 and feature processing 204. The feature processing 204 includes vehicle detection 206 and vehicle tracking 208 sub-processes.

The task of the feature extraction module 202 is to efficiently extract features from input video data 210, comprising a plurality of image frames, indicating the presence of vehicles in a current frame. These features are subsequently processed (in step 204) to reliably detect and track the vehicles.

Figure 3:
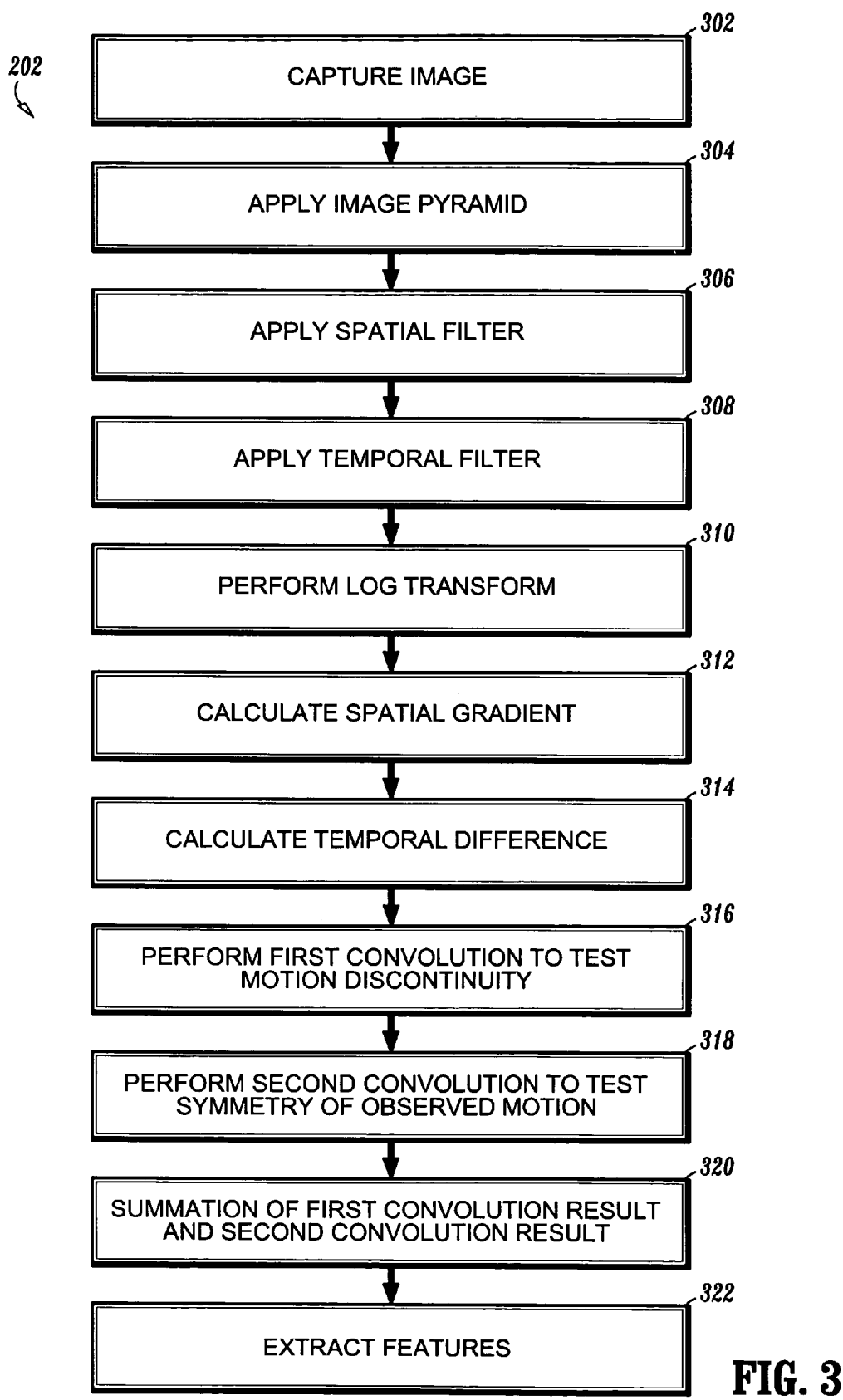
FIG. 3 is a flow diagram illustrating a method for feature extraction according to an embodiment of the present invention.

FIG. 3 is a flow diagram illustrating a method for feature extraction 202 according to an embodiment of the present invention.

Initially, a plurality of image capture devices 116 capture a plurality of image frames (step 302) viewing at least one lane of traffic in a tunnel. A detection line is defined for each traffic lane. The detection line is simply a line for detection drawn across each lane being viewed. The following operations are executed and implemented in integer arithmetic.

An image pyramid is applied to the image frames to reduce the resolution of the frames (step 304) for faster processing. Preferably, a 4x/2y pyramid is employed to reduce the resolution from 384×288 to 96×144 pixels. Next, a spatial filter is applied to the image frames (step 306), e.g., an integer implementation of 2 dimensional, separable 3×3 Gaussian filter. Then, the output of the spatial filter is applied to a temporal filter (step 308), e.g., an integer implementation of 1 Dimensional Gaussian filter for 3 adjacent frames. Subsequently, a Log transform is implemented with a LUT (look-up table) of 256 entries (step 310).

Next, a positive spatial gradient is calculated (step 312), e.g., absolute differences on the x and y dimension. Then, the temporal difference is calculated between the gradients (step 314). That is, the positive differences computed between the spatial gradients of neighboring frames is calculated. For example, the frame N is compared to frames N+FRAMEDIF and N−FRAMEDIF, where FRAMEDIF is a differential between frames, e.g., 2.

Two convolutions with a 2 dimensional box kernel along the detection line of each lane are then performed (steps 316, 318). The first convolution (step 316) tests the motion discontinuity at the back bottom of a vehicle. Thus, the kernel size has a width of a predetermined typical car and the height of one and a half times the predetermined car. Two thirds of the kernel 212 have positive values and are located above the detection line and one third has negative values and is located below the detection line. The second convolution (step 318) tests the symmetry of the observed motion from the first convolution. Thus, the kernel size has the width and height of the predetermined typical car. The left part of the kernel 214 has positive values and the right part has negative values. Through a summation process (step 320), the absolute value of the second convolution is subtracted from the result of first convolution resulting in an objective function used to extract the image features (step 322), as shown in image 211 of FIG. 2.

Additional convolutions can be applied as a function of the application scenario. For example, one can penalize the final result if there is less apparent motion in the center of the kernel used in the first convolution in comparison to the motion at the extremities (on vertical direction).

Figure 4:
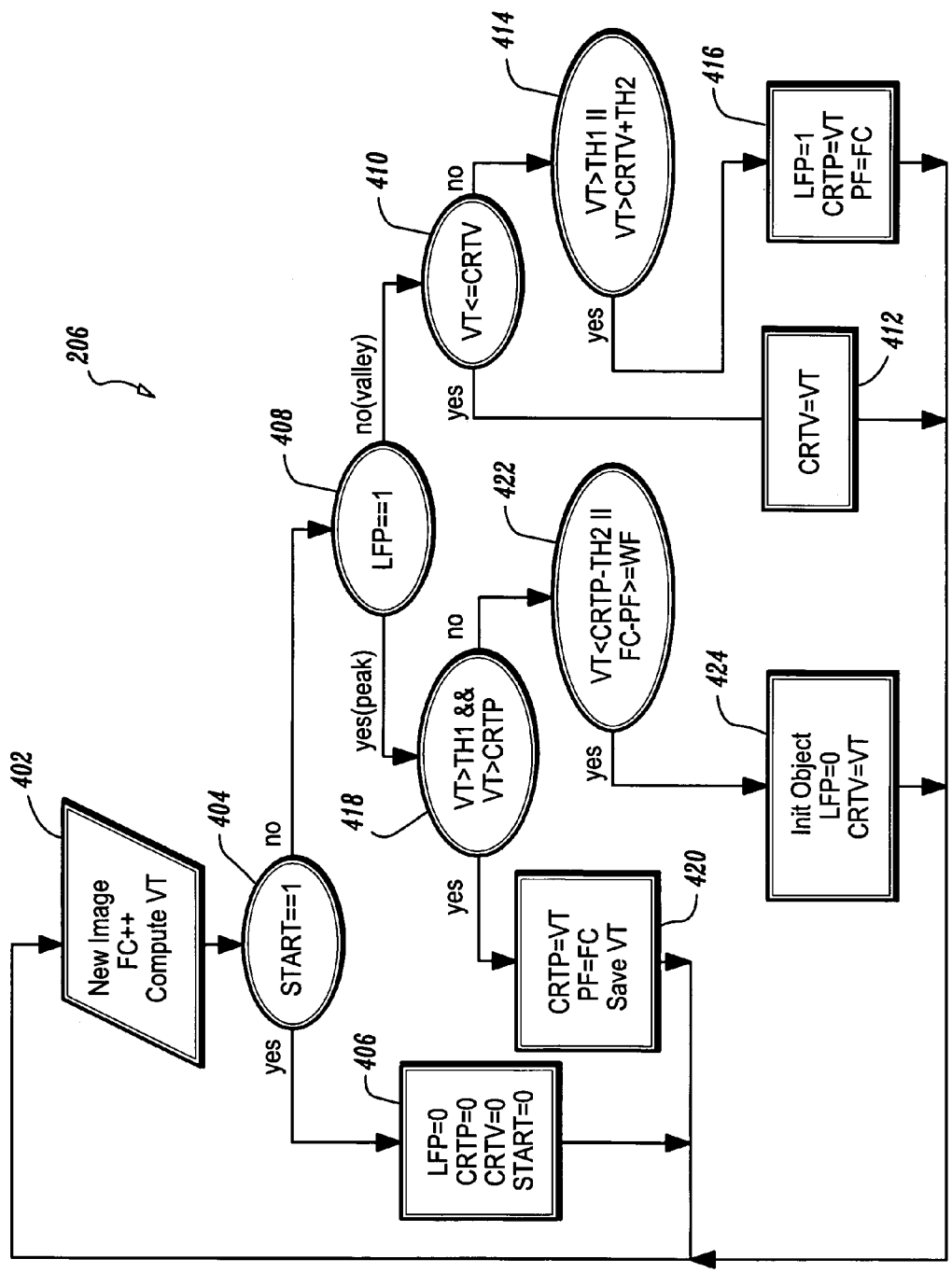
FIG. 4 is a flow diagram illustrating a method of vehicle detection according to an embodiment of the present invention.

Once the features are extracted from the image frames, the features are processed for vehicle detection and tracking. To detect a vehicle from the extracted features, a maximum (peak) along each detection line of the objective function from step 320 is found. Then, the maxima are analyzed along the temporal dimension. A process for peak detection in the temporal domain is executed and its block flow diagram is illustrated in FIG. 4. In FIG. 4, the following notations are used:

FC=current frame counter
VT=value of the objective function computed for the current frame
START=variable indicating the start of the process
LFP=look for peak; is 1 when looking for a peak and 0 if looking for a valley
CRTP=value of the current peak
CRTV=value of the current valley
PF=index of the frame where the maximum was detected
WF=number of frames to wait for peak confirmation
TH1=threshold ensuring a large peak amplitude
TH2=threshold ensuring the hysteresis (one forth of TH1)

This process is executed for each frame and lane. It has two states: one looks for peaks (e.g., when LFP=1), the other looks for valleys (e.g., when LFP=0). A peak is validated when it follows a valley and the amplitude of the objective function measured after the peak decreases at least by threshold TH2 or after WF frames. A valley is validated when the amplitude of the objective function measured after the valley increases at least by threshold TH2. For both cases the amplitude of the objective function should be larger than threshold TH1.

Referring to FIG. 4, image frames with extracted features from step 320 above is inputted to the detection process at step 402. Initially at step 404, START is set to 0 and the process goes to step 406 where variables Look For Peak LFP, value of the current peak CRTP, value of the current valley CRTV and START are initialized to zero. The process then returns through step 404 where START is now equal to 1 and the process goes to step 408. Initially, since LFP equals 0, the process will first look for a valley.

At step 410, it will be determined if the value of the objective function computed at the current frame VT is less than or equal to the value of the current valley CRTV. If so, it is determined that the VT is going down and not at the valley yet and CRTV will be set to VT at step 412. The process will return to step 410 and, if it is determined that VT is greater than CRTV, it will be determined that the lowest point of the valley was reached. The valley is validated in step 414 by verifying that VT is greater than threshold TH1 or that VT is greater than CRTV plus threshold TH2. Once the valley is validated, LFP will be set to 1, the value of the current peak CRTP will be set to VT and the index frame where the maximum peak was detected PF will be set to the current frame FC, in step 416.

Since LFP is now set to 1, the process will now look for a peak at step 408. In step 418, the process will determine if VT is greater than threshold TH1 and if VT is greater than the value of the current peak CRTP. If so, in step 420, the process will set CRTP to VT, and the index of the frame where the maximum was detected PF will be set to the current frame FC. Once the peak has been detected, it will be validated in step 422, where the process will verify if VT is less than the value of the current peak CRTP minus threshold TH2 or if the current frame FC minus the index of the frame where the maximum was detected is greater than the number of frames to wait for peak confirmation WF. Once the peak is validated, the detected object, e.g., a vehicle, is initialized, LFP is set to 0 and the value of the current valley is set to VT.

Figure 5:
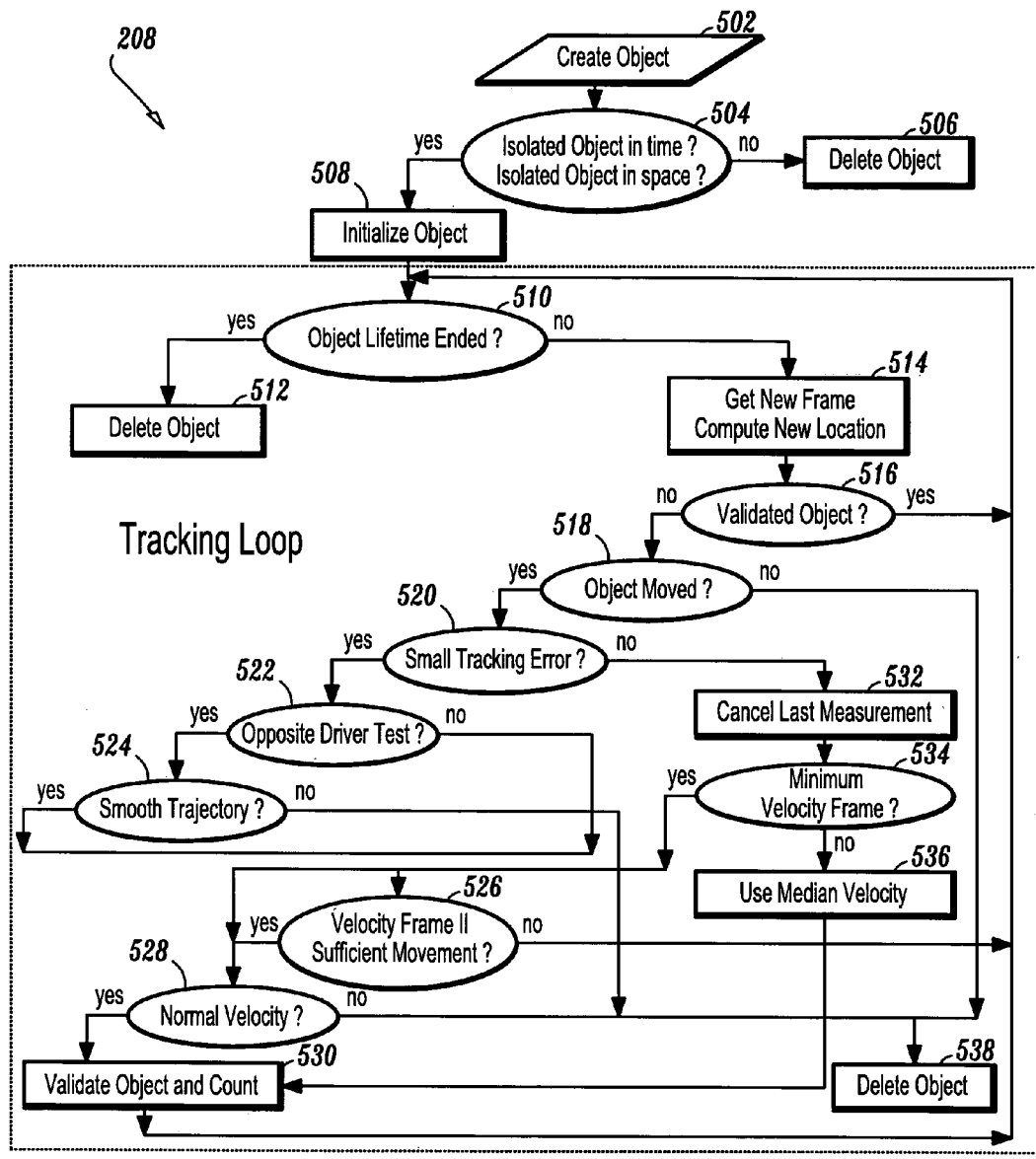
FIG. 5 is a flow diagram illustrating a method of vehicle tracking according to an embodiment of the present invention.

Referring to FIG. 5, after the object is detected (step 502) and before the tracking process is initiated, spurious detections are removed. An isolation criterion in time is imposed for the detected peaks along the detection line in step 504. The neighborhood of the detected region is tested and the false responses are canceled. If the detected object does not meet the criteria, the object will be deleted in step 506.

Once a vehicle is detected and confirmed, the tracking process is initialized with a box representing the spatial and difference gradient of the vehicle (step 508), as shown in image 216 of FIG. 2. This box is tracked over time and its velocity is estimated. The tracked objects are stored in a doubly linked list. The processing of each object in the list during tracking will be described with reference to FIG. 5.

Once the object is initialized (step 508), the object is checked to see if it is still in an image frame, e.g., has its lifetime ended (step 510). If so, the object will be deleted in step 512. If it is determined that the object is present, the process will get a new image frame and determine the new location of the object in step 514. Next, in step 516, the object at its new location will be validated. In step 518, it will be determined if the object moved and, if it is determined the object has not moved, it will be deleted in step 538. If the object has moved, a tracking error will be calculated (step 520).

If the tracking error is small, the process will perform an opposite driver test to determine if the object is going in the proper direction (step 522). The correct direction of traffic flow for each traffic lane will be predetermined. If it is determined the object is going in the wrong direction, the process will check to see if the object has a smooth trajectory to determine if it is jumping lanes (step 524). If the object does not have a smooth trajectory, it will be deleted in step 538. Otherwise, if the object is going in the proper direction or if the object is going in the wrong direction but has a smooth trajectory, the process will go to step 526 where it will check to see if a minimum number of image frames has been reached, e.g., a predetermined velocity frame, or if the object has sufficient movement. If not, the process will return to step 510. Otherwise, in step 528, the process will determine if the object is moving at a predetermined velocity, e.g., a normal velocity for vehicles. If the object is not moving at the predetermined velocity, it will be deleted in step 538. Otherwise, the object is validated and counted in step 530 and the process returns to step 510.

However, if the tracking error determined in step 520 is large, the last measurement of the velocity of the object will be cancelled in step 532. Next, in step 534, the process will determine if the minimum velocity frame has been reached. If so, the process will continue to step 528 and proceed as described above. Otherwise, the process will use a median velocity (step 536) and proceed to step 530.

Figure 6:
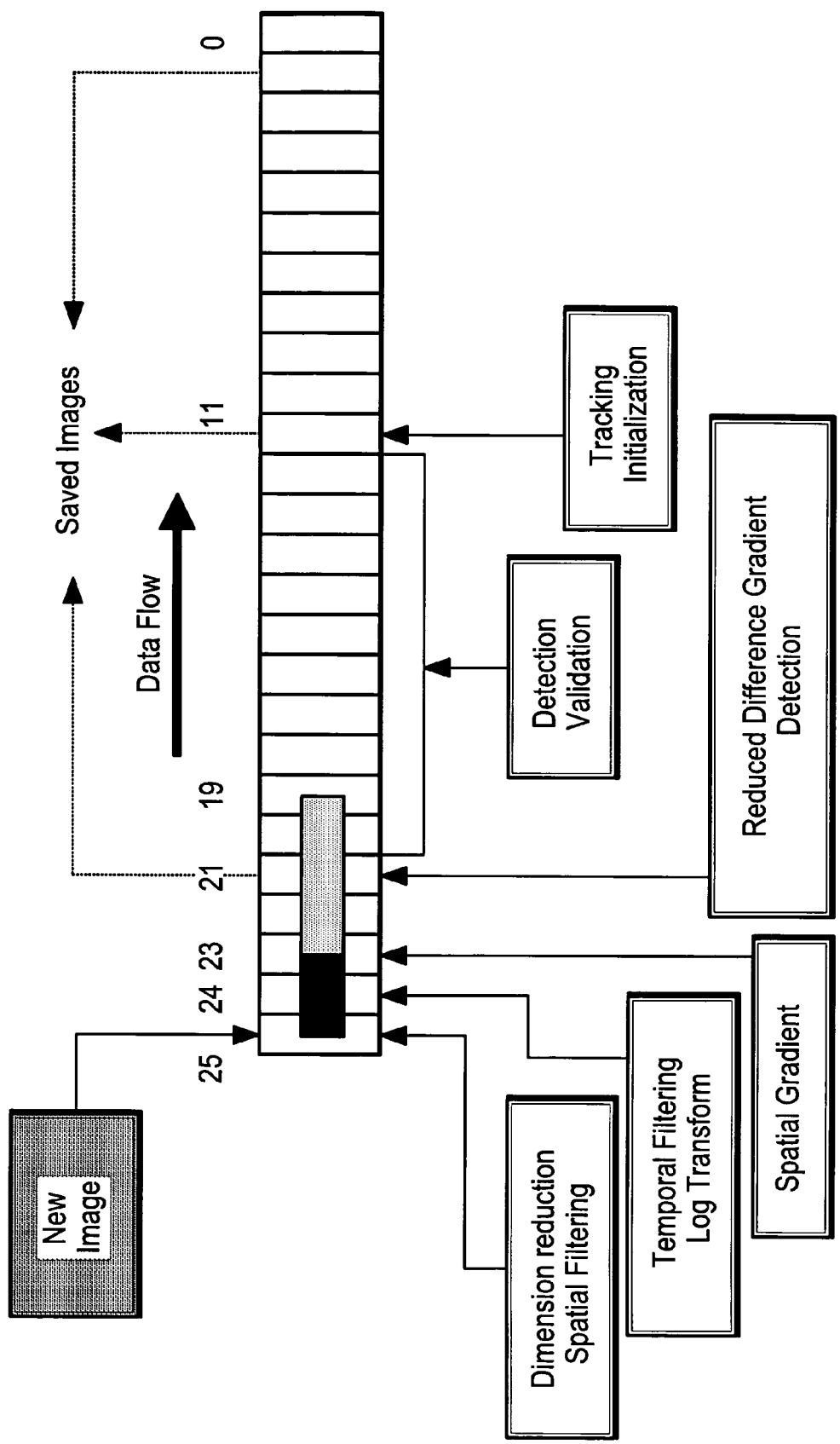
FIG. 6 is a data flow diagram for illustrating how image frames captured by a camera are processed according to an embodiment of the present invention.

FIG. 6 is a data flow diagram for illustrating how image frames captured by a camera are processed according to an embodiment of the present invention. The various steps described above are indicated along the image frame data stream.

In the illustrative example of FIG. 6, image frames are processed at 25 frames per second (fps). The video data needed for detection is managed in a ring buffer of size FRAMES; as shown in FIG. 6, FRAMES=26. The number of frames needed to track a vehicle from the moment of detection is managed in a ring buffer of size MAXTCOUNT, e.g., 80. Tracking is performed as the vehicle is going forward and is also tracked going backward from use of recorded image frames. Therefore, for tracking, information from 2×MAXTCOUNT frames=160 frames is needed. The total data needed for detection and tracking is managed in a ring buffer of size TOTALFRAMES, where TOTALFRAMES=FRAMES+MAXTCOUNT (e.g., 186 in the example of FIG. 6).

The system and method supports additional functionalities such as the detection and tracking of bi-directional traffic and the detection of opposite drivers. The bi-directional traffic is handled in the same way as the unidirectional traffic described above except that one additional tracking module is needed. This module tracks the vehicles in the past.

The information derived from the above described detection and tracking process can be handled off to other processes for various purposes. For example, by counting the vehicles traversing the tunnel, the system can create maintenance schedules to be presented to an operator or to generate work orders for maintenance personnel. Additionally, by tracking the velocity of vehicles, the system can issue traffic warnings if congestion is detected or alert vehicles approaching or entering the tunnel that a stopped vehicle is inside the tunnel. Furthermore, upon detection of stopped vehicles, the system may alarm the operator via the display device or an annunciating device and/or contact the appropriate service to assist the vehicle occupant.

While the invention has been shown and described with reference to certain preferred embodiments thereof, it will be understood by those skilled in the art that various changes in form and detail may be made therein without departing from the spirit and scope of the invention as defined by the appended claims.

What is claimed is:

1. A method for vehicle detection and tracking, the method comprising the steps of:
    capturing a plurality of image frames viewing at least one traffic lane;
    extracting at least one feature from the plurality of image frames;
    detecting at least one object indicative of a vehicle from the extracted feature; and
    tracking the detected vehicle over time to determine the detected vehicle's velocity, wherein a detection line is defined for the at least one traffic lane; and wherein the extracting step comprises:
    calculating a positive spatial gradient for each of the plurality of frames;
    calculating temporal differences between the spatial gradients of neighboring frames; and
    performing convolutions along the detection line of the at least one traffic lane for extracting the at least one feature.

2. The method of claim 1, wherein the performing convolutions step comprises:
    performing a first convolution for testing motion discontinuity of the extracted feature with a first, two-dimensional kernel; and
    performing a second convolution for testing symmetry of the observed motion with a second, two-dimensional kernel.

3. The method of claim 2, wherein the extracting step further comprises subtracting the absolute value of the result of the second convolution from a result of the first convolution resulting in an objective function.

4. The method of claim 2, wherein the first kernel having a width of a predetermined vehicle and a height of one and half times the predetermined vehicle and the second kernel having a width and height of the predetermined vehicle.

5. The method of claim 3, wherein the detecting step comprises:
    determining a maximum value along the detection line of the objective function, wherein the maximum is indicative of the detected vehicle.

6. The method of claim 5, wherein the detecting step comprises:
    analyzing the maximum value along the temporal dimension by comparing the maximum value to a first threshold to ensure the maximum value is at a peak.

7. The method of claim 6, wherein the detecting step further comprises:
    imposing an isolation criteria in time to the determined maximum value; and
    removing false responses from the neighboring region.

8. The method as in claim 1, wherein the tracking step comprises the steps of:
    determining a direction of the detected vehicle; and
    comparing the determined direction to a predetermined direction, whereby confirming the detected vehicle is going in the right direction.

9. The method as in claim 1, further comprising the step of counting a number of detected vehicles over a predetermined period of time.

10. A system for vehicle detection and tracking, the system comprising:
    at least one image capture device for capturing a plurality of image frames viewing at least one traffic lane; and
    a processor adapted for extracting at least one feature from the plurality of image frames, detecting at least one object indicative of a vehicle from the extracted feature, and tracking the detected vehicle over time to determine the detected vehicle's velocity; wherein the processor is adapted for defining a detection line for the at least one traffic lane; and
    wherein the processor is further adapted for calculating a positive spatial gradient for each of the plurality of frames, calculating temporal differences between the spatial gradients of neighboring frames, and performing convolutions along the detection line of the at least one traffic lane for extracting the at least one feature.

11. The system of claim 10, wherein the processor is further adapted for performing a first convolution for testing motion discontinuity of the extracted feature with a first, two-dimensional kernel, and performing a second convolution for testing symmetry of the observed motion with a second, two-dimensional kernel.

12. The system of claim 11, wherein the processor is further adapted for subtracting the absolute value of the result of the second convolution from a result of the first convolution resulting in an objective function.

13. The system of claim 12, wherein the processor is further adapted for determining a maximum value along the detection line of the objective function, wherein the maximum is indicative of the detected vehicle.

14. The system as in claim 10, wherein the processor is adapted for determining if the detected vehicle is stopped, further comprising an annunciating device for issuing an alert when the detected vehicle is determined to be stopped.

15. A program storage device readable by a machine, tangibly embodying a program of instructions executable by the machine to perform the method steps for vehicle detection and tracking, the method steps comprising:

capturing a plurality of image frames viewing at least one traffic lane;
extracting at least one feature from the plurality of image frames;
detecting at least one object indicative of a vehicle from the extracted feature; and
tracking the detected vehicle over time to determine the detected vehicle's velocity;
wherein the extracting step comprises:

calculating a positive spatial gradient for each of the plurality of frames; calculating temporal differences between the spatial gradients of neighboring frames; and
performing convolutions along the detection line of the at least one traffic lane for extracting the at least one feature.

* * * * *